United States Patent
Rakeman et al.

(10) Patent No.: US 10,371,792 B2
(45) Date of Patent: Aug. 6, 2019

(54) SYSTEM AND METHOD FOR PROVIDING REMOTE TARGET IDENTIFICATION USING RADIOFREQUENCY IDENTIFICATION

(71) Applicant: Thales-Raytheon Systems Company LLC, Fullerton, CA (US)

(72) Inventors: James W. Rakeman, Brea, CA (US); David E. Stephens, Chino Hills, CA (US); Thomas W. Miller, Yorba Linda, CA (US)

(73) Assignee: Raytheon Command and Control Solutions LLC, Fullerton, CA (US)

( * ) Notice: Subject to any disclaimer, the term of this patent is extended or adjusted under 35 U.S.C. 154(b) by 187 days.

(21) Appl. No.: 14/802,517

(22) Filed: Jul. 17, 2015

(65) Prior Publication Data
US 2017/0016977 A1  Jan. 19, 2017

(51) Int. Cl.
| | |
|---|---|
| *G01S 7/03* | (2006.01) |
| *G01S 7/00* | (2006.01) |
| *B64C 39/02* | (2006.01) |
| *G01S 13/86* | (2006.01) |
| *G01S 13/66* | (2006.01) |

(Continued)

(52) U.S. Cl.
CPC ............ G01S 7/003 (2013.01); B64C 39/024 (2013.01); G01S 13/42 (2013.01); G01S 13/66 (2013.01); G01S 13/74 (2013.01); G01S 13/86 (2013.01); G01S 17/74 (2013.01);
(Continued)

(58) Field of Classification Search
CPC .......... G01S 7/003; G01S 13/42; G01S 13/66; G01S 13/74; G01S 13/86; G01S 17/74; G01S 13/865; G01S 13/867; G01S 13/75; G01S 13/751; G01S 13/758; G01S 13/767; G01S 13/78; G01S 7/418; G01S 7/42; G01S 13/00; G01S 17/87; G01S 2013/9367; B64C 39/024; B64C 2201/12;
(Continued)

(56) References Cited

U.S. PATENT DOCUMENTS 4,050,068 A * 9/1977 Berg ........................ G01S 13/86
                                                                                                     342/53
4,731,879 A * 3/1988 Sepp ........................ G01S 17/74
                                                                                                     342/45

(Continued)

FOREIGN PATENT DOCUMENTS

| EP | 1785743 A1 | 5/2007 |
|---|---|---|
| GB | 2414895 A | 12/2005 |

OTHER PUBLICATIONS

Notification of Transmittal of the International Search Report and the Written Opinion of the International Searching Authority dated Oct. 26, 2016 in connection with International Application No. PCT/US2016/042665, 13 pages.

(Continued)

*Primary Examiner* — Bernarr E Gregory
*Assistant Examiner* — Daniel P Malley, Sr.

(57) ABSTRACT

A system for providing remote target identification is provided that includes a radar system and an electro-optical detector. The radar system is configured to locate a remote target. The electro-optical detector is configured to detect an optical signal transmitted from the target when the target is located. The optical signal includes identifying data for the target.

20 Claims, 6 Drawing Sheets

(51) Int. Cl.
*G06K 7/10* (2006.01)
*H04B 10/50* (2013.01)
*G01S 17/74* (2006.01)
*G01S 13/42* (2006.01)
*G01S 13/74* (2006.01)

(52) U.S. Cl.
CPC ....... *G06K 7/10366* (2013.01); *H04B 10/502* (2013.01); *B64C 2201/12* (2013.01)

(58) Field of Classification Search
CPC .... G06K 7/10366; H04B 10/502; F41G 3/26; F41J 2/00; F41J 2/02
See application file for complete search history.

(56) References Cited

U.S. PATENT DOCUMENTS

| | | | | |
|---|---|---|---|---|
| 4,814,769 A * | 3/1989 | Robin | ............ | G01S 13/78 342/45 |
| 4,837,575 A * | 6/1989 | Conner, Jr. | ............ | G01S 13/78 342/45 |
| 5,130,713 A * | 7/1992 | Wagner | ............ | G01S 13/74 342/45 |
| 5,170,168 A * | 12/1992 | Roth | ............ | G01S 13/78 342/45 |
| 5,396,243 A * | 3/1995 | Jalink, Jr. | ............ | G01S 17/023 342/45 |
| 6,058,071 A * | 5/2000 | Woodall | ............ | H04B 11/00 367/134 |
| 6,275,283 B1 * | 8/2001 | Hasson | ............ | G01C 3/08 250/339.15 |
| 6,933,879 B2 * | 8/2005 | Roze | ............ | G01S 13/78 342/118 |
| 7,362,258 B2 * | 4/2008 | Kawabe | ............ | G01S 1/70 342/146 |
| 8,169,312 B2 * | 5/2012 | Frederick | ............ | G01S 13/58 340/10.1 |
| 2005/0040241 A1 * | 2/2005 | Raskar | ............ | G06K 7/1097 235/492 |
| 2005/0206503 A1 * | 9/2005 | Corrado | ............ | G06K 7/10079 340/10.5 |
| 2006/0103568 A1 * | 5/2006 | Powell | ............ | G01S 13/74 342/42 |
| 2007/0223920 A1 * | 9/2007 | Moore | ............ | H04B 10/077 398/38 |
| 2008/0252293 A1 * | 10/2008 | Lagae | ............ | G01S 7/411 324/318 |
| 2009/0231104 A1 * | 9/2009 | Kofman | ............ | G06K 7/10009 340/10.1 |
| 2010/0013696 A1 * | 1/2010 | Schmitt | ............ | G01S 7/024 342/54 |
| 2012/0256730 A1 * | 10/2012 | Scott | ............ | G01S 5/0221 340/10.1 |

OTHER PUBLICATIONS

Sample et al., "Optical Localization of Passive UHF RFID Tags with Integrated LEDs", IEEE International Conference on RFID (RFID), 2012, 8 pages, Seattle, U.S.

Banta et al.; "Machine Vision-Based Bar Code Scanning for Long Range Applications", Part of the SPIE Conference on Intelligent Systems in Design and Manufacturing, Nov. 1998, 9 pages, SPIE vol. 3517, SPIE, Morgantown, West Virginia, U.S.

* cited by examiner

SYSTEM AND METHOD FOR PROVIDING REMOTE TARGET IDENTIFICATION USING RADIOFREQUENCY IDENTIFICATION

CROSS-REFERENCE TO RELATED APPLICATION

This application is related to U.S. patent application Ser. No. 14/802,634 titled, "System and Method for Providing Remote Target Identification Using Optical Tagging," which is being filed concurrently herewith. This related application is hereby incorporated by reference in its entirety.

TECHNICAL FIELD

The present disclosure is directed, in general, to radar targeting systems and, more specifically, to a system and method for providing remote target identification using radiofrequency identification.

BACKGROUND

On the battlefield, it is extremely important to be able to distinguish between enemy and friendly targets, such as unmanned aerial vehicles (UAVs), personnel and surface craft or vehicles. Currently, the solution to this problem for UAVs typically includes the use of an on-board identification friend or foe (IFF) transponder to identify the UAV. However, on-board IFF transponders may only be used with relatively large UAVs due to the payload limitations of smaller UAVs.

SUMMARY

This disclosure provides a system and method for providing remote target identification using radiofrequency identification.

In one embodiment, a system for providing remote target identification is provided. The system includes a radar system and an electro-optical detector. The radar system is configured to locate a remote target. The electro-optical detector is configured to detect an optical signal transmitted from the target when the target is located. The optical signal includes identifying data for the target.

In another embodiment, a remotely identifiable target is provided. The target includes a radiofrequency identification (RFID) tag and an optical transmitter. The RFID tag includes identifying data for the target. The optical transmitter is configured to generate an optical signal based on the identifying data and to transmit the optical signal.

In yet another embodiment, a method for providing remote target identification is provided. The method includes detecting a radar signal at a remote target that has an optical identification (ID) system. The optical ID system includes an RFID tag and an optical transmitter. Identifying data for the target is provided from the RFID tag to the optical transmitter based on the radar signal being detected at the target. An optical signal is generated based on the identifying data. The optical signal is transmitted.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
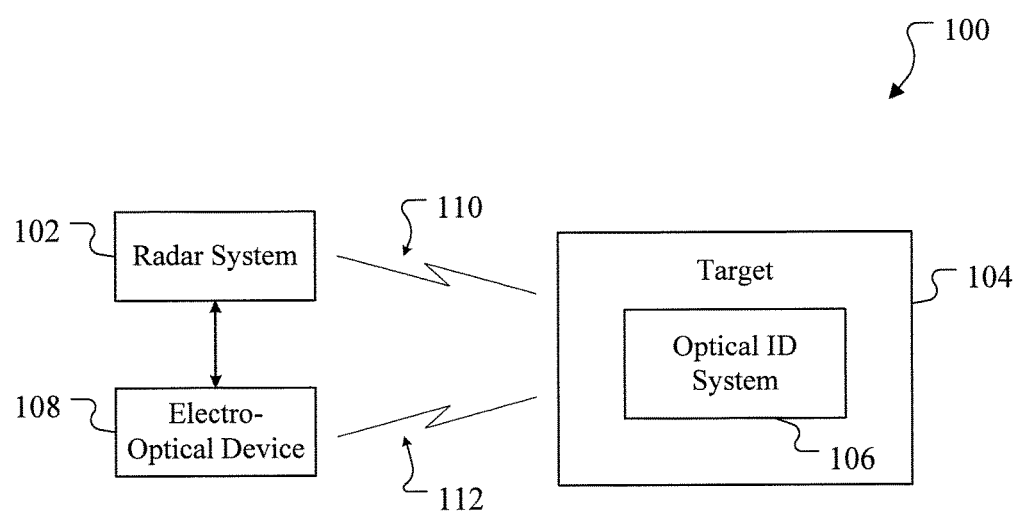
FIG. 1 illustrates a system for providing remote target identification in accordance with an embodiment of the present disclosure.

FIG. 1 illustrates a system 100 for providing remote target identification in accordance with an embodiment of the present disclosure. The embodiment of the system 100 shown in FIG. 1 is for illustration only. Other embodiments of the system 100 could be used without departing from the scope of this disclosure.

For the illustrated embodiment, the system 100 includes a radar system 102, a remote target 104 with an optical identification (ID) system 106, and an electro-optical device 108. As used herein, a "remote" target 104 is a target 104 that may be located 2 km or more away from the radar system 102. The radar system 102 is configured to locate the target 104 using a radar signal 110. For some embodiments, the radar system 102 may be configured to detect and track relatively small targets 104, such as small UAVs. The optical ID system 106 is configured to provide optical data associated with the target 104 such that the target 104 may be identified based on that data. For some embodiments, the data may identify the target 104 uniquely (i.e., identify that particular target 104). For other embodiments, the data may identify a type of target (e.g., a UAV or a specific type of UAV), that the target 104 is friendly or a known entity to the radar system 102, or any other suitable characteristic of the target 104.

The electro-optical device 108 is configured to obtain (i.e., to scan, read, receive and/or otherwise obtain) the optical data provided by the optical ID system 106 through an optical signal 112. The electro-optical device 108 may also be configured to determine an identity of the target 104 based on the optical data and to determine a status of the target 104 based on the identity of the target 104. For example, the status of the target 104 may include whether or not the target 104 is friendly. The electro-optical device 108 is also configured to provide the identity and/or the status of the target 104 to the radar system 102.

The radar system 102 is configured to output the information provided by the electro-optical device 108 to a display screen (not shown in FIG. 1) or to otherwise suitably provide the information to an operator of the radar system 102. For example, the radar system 102 may generate a particular graphic related to each target 104 being tracked to identify whether the target 104 is friendly or not. For a particular example, a first symbol and/or a first color may indicate a friendly target 104, while a second or third symbol and/or a second or third color may indicate an enemy or unknown target.

The electro-optical device 108 may be co-mounted and north-aligned with the radar system 102. In addition, the electro-optical device 108 may be coupled to the radar system 102 through an electronic interface, such as a serial, Ethernet or other suitable interface. For some embodiments, the optical ID system 106 may be configured to generate the optical signal 112 to actively provide the optical data to the electro-optical device 108. However, for other embodiments, the optical ID system 106 may be configured to passively provide the optical data, while the electro-optical device 108 is configured to generate the optical signal 112 to obtain the optical data from the optical ID system 106.

In this way, the system 100 may identify, and determine a status for, a remote target 104 using a low-cost, lightweight and compact solution that may be implemented even with relatively small targets 104, such as small UAVs. Because the cost of destroying friendly UAVs can be $50,000-$250,000 or more and the cost of not destroying enemy UAVs is immeasurable (potentially exceeding millions of dollars in tactical compromise and possible loss of human life), this relatively low-cost system 100 provides a substantial advantage on the battlefield. In addition, the system 100 may be implemented in situations other than battlefields. For example, the target 104 may be a commercial or small, personal or civilian aircraft. For this example, the system 100 may be able to identify an aircraft even if its transponder is malfunctioning or has been intentionally disabled.

Although FIG. 1 illustrates one example of a system 100 for providing remote target identification, various changes may be made to the embodiment shown in FIG. 1. For example, the makeup and arrangement of the system 100 are for illustration only. Components could be added, omitted, combined, subdivided, or placed in any other suitable configuration according to particular needs.

Figure 2:
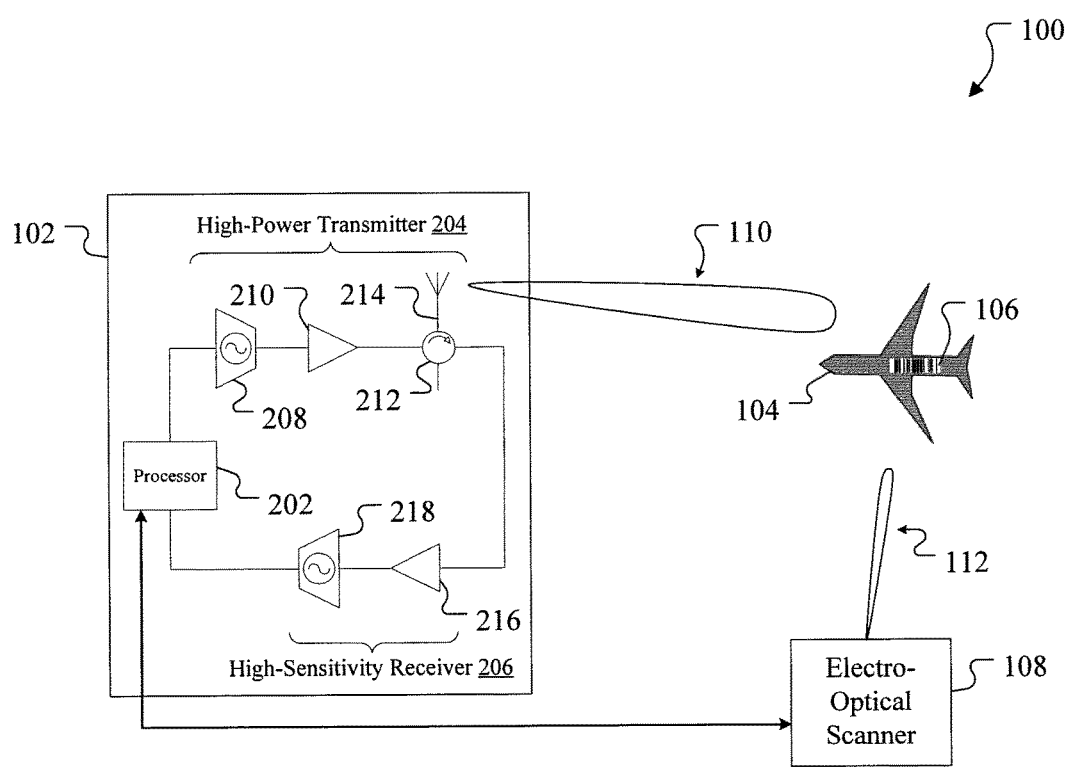
FIG. 2 illustrates details of the system of FIG. 1 in accordance with an embodiment of the present disclosure.

FIG. 2 illustrates details of the system 100 in accordance with an embodiment of the present disclosure. For the illustrated embodiment, the system 100 is configured to provide remote target identification using optical tagging. The embodiment of the system 100 shown in FIG. 2 is for illustration only. Other embodiments of the system 100 could be used without departing from the scope of this disclosure.

For this embodiment, the electro-optical device is represented by an electro-optical scanner 108, the target is represented by an unmanned aerial vehicle (UAV) 104, and the optical ID system is represented by an optical code 106. The optical code 106, which may be coupled to the UAV 104 in any suitable manner, includes data associated with the UAV 104 such that the UAV 104 may be identified based on that data. As described in connection with FIG. 1, the data may identify the particular UAV 104, a type of the UAV 104, that the UAV 104 is friendly, or the like. The optical code 106 may include a barcode, be color-coded, use retro-reflector technology, or include any other suitable visual data.

For the illustrated embodiment, the radar system 102 includes a processor 202, a high-power transmitter 204 and a high-sensitivity receiver 206. The processor 202 is coupled to the transmitter 204 and the receiver 206, as well as to the electro-optical scanner 108. The transmitter 204 includes a signal/waveform generator 208, a high-power amplifier 210, a circulator/duplexer 212 and a high-gain antenna 214. The receiver 206 includes a low-noise receiver 216 and a demodulator 218. For some embodiments, the signal/waveform generator 208 and the demodulator 218 may each include a frequency converter.

The processor 202 is configured to provide radar detection and tracking of the UAV 104 through the transmitter 204 and the receiver 206, as indicated by the radar signal 110, which may represent a high-gain antenna beam. After the UAV 104 is located by the radar system 102, the processor 202 is also configured to notify the electro-optical scanner 108 of the location of the UAV 104.

Based on the UAV location, the electro-optical scanner 108 is configured to scan the optical code 106 on the UAV 104 using the optical signal 112 (either actively or passively). The electro-optical scanner 108 is also configured to read optical data provided in the optical code 106. For some embodiments, the electro-optical scanner 108 is configured to determine an identity of the UAV 104 based on the optical data and to determine a status of the UAV 104 (e.g., friendly or enemy or unknown) based on the determined identity. The electro-optical scanner 108 is also configured to provide the identity and/or the status of the UAV 104 to the processor 202 of the radar system 102.

Although FIG. 2 illustrates one example of a system 100 for providing remote target identification using optical tagging, various changes may be made to the embodiment shown in FIG. 2. For example, the makeup and arrangement of the system 100 are for illustration only. Components could be added, omitted, combined, subdivided, or placed in any other suitable configuration according to particular needs.

Figure 3:
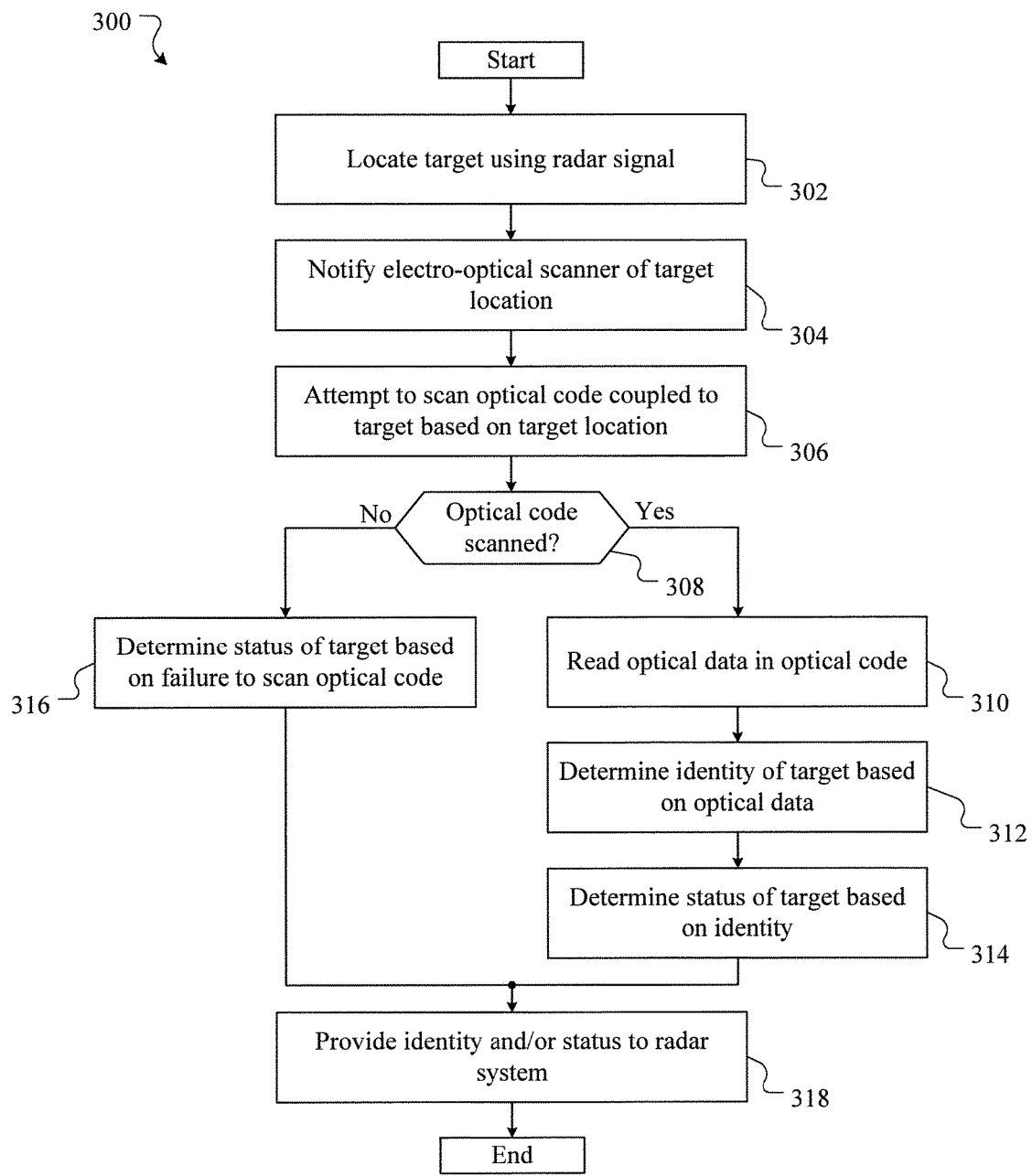
FIG. 3 is a flowchart illustrating a method for providing remote target identification using optical tagging in accordance with an embodiment of the present disclosure.

FIG. 3 is a flowchart illustrating a method 300 for providing remote target identification using optical tagging in accordance with an embodiment of the present disclosure. The method 300 shown in FIG. 3 is for illustration only. Remote target identification using optical tagging may be provided in any other suitable manner without departing from the scope of this disclosure.

Initially, a radar system 102 locates a target (such as a UAV or other suitable target) using a radar signal 110 (step 302). The radar system 102 notifies an electro-optical scanner 108 of the location of the target (step 304). For example, in some embodiments, a processor 202 of the radar system 102 notifies the electro-optical scanner 108 of the location. Based on the target location provided by the radar system 102, the electro-optical scanner 108 attempts to scan an optical code 106 coupled to the target (step 306).

If the target 104 includes an optical code 106 and the electro-optical scanner 108 successfully scans the optical code 106 (step 308), the electro-optical scanner 108 reads optical data included in the optical code 106 (step 310) and determines an identity of the target 104 based on the optical data (step 312). For example, in some embodiments, the electro-optical scanner 108 may determine an identity of the particular target 104, an identity of a type of the target 104, or the like.

The electro-optical scanner 108 determines a status of the target 104 based on the identity (step 314). For example, in some embodiments, the electro-optical scanner 108 may determine that the status of the target 104 is "friendly" if the target 104 has been identified (i.e., the target 104 has an optical code 106 that was able to be scanned) or if the determined identity corresponds to a known friendly target 104.

If the target located by the radar system 102 does not include an optical code 106, when the electro-optical scanner 108 attempts to scan an optical code 106 (step 306), no optical code 106 is successfully scanned (step 308) and, thus, the electro-optical scanner 108 determines a status of the target based on the failure to scan an optical code 106 (step 316). For example, in some embodiments, the electro-optical scanner 108 may determine that the status of the target is "enemy" (or "unknown") based on the failure to scan an optical code 106.

After determining a status of the target 104 (step 314) or target (step 316), the electro-optical scanner 108 provides the identity and/or the status to the radar system 102 (step 318). For example, in some embodiments, the electro-optical scanner 108 may provide the identity and/or the status to the processor 202 of the radar system 102.

Although FIG. 3 illustrates one example of a method 300 for providing remote target identification using optical tagging, various changes may be made to the embodiment shown in FIG. 3. For example, while shown as a series of steps, various steps in FIG. 3 could overlap, occur in parallel, occur in a different order, or occur multiple times. For a specific example, the electro-optical scanner 108 may provide the optical data to the radar system 102, and the radar system 102 may then determine the identity of the target 104 based on the optical data and the status of the target 104 based on the identity. As another alternative, the electro-optical scanner 108 may determine the identity of the target 104 based on the optical data and provide the identity to the radar system 102, and the radar system 102 may then determine the status of the target 104 based on the identity. In addition, for some embodiments, the determined identity may include an identity of the status of the target 104 (e.g., that the target 104 is friendly). For these embodiments, a separate determination of the status of the target 104 may be omitted.

Figure 4:
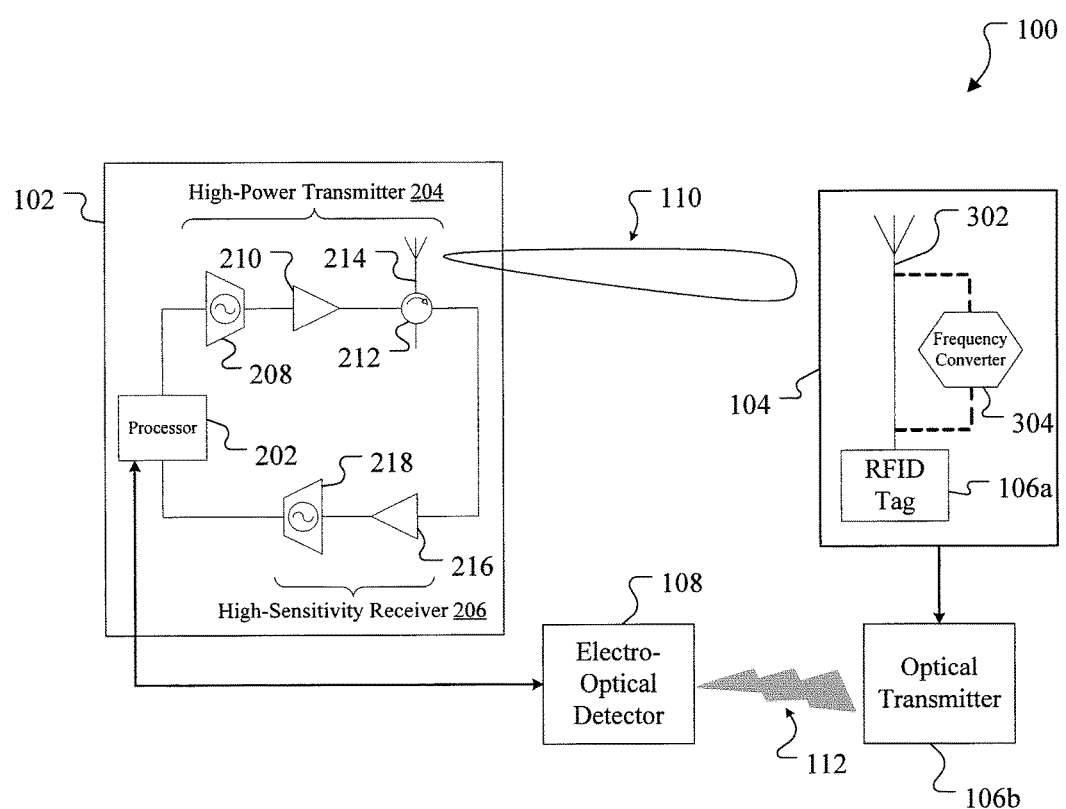
FIG. 4 illustrates details of the system of FIG. 1 in accordance with another embodiment of the present disclosure.

FIG. 4 illustrates details of the system 100 in accordance with another embodiment of the present disclosure. For the illustrated embodiment, the system 100 is configured to provide remote target identification using radiofrequency identification (RFID). The embodiment of the system 100 shown in FIG. 4 is for illustration only. Other embodiments of the system 100 could be used without departing from the scope of this disclosure.

For this embodiment, the radar system 102 includes a processor 202, a high-power transmitter 204 and a high-sensitivity receiver 206, and the target 104 includes an RFID antenna 302, an optional frequency converter 304, and an RFID tag 106a. The RFID tag 106a, which may be passive, semi-active or active, includes data associated with the target 104 such that the target 104 may be identified based on that data. As described in connection with FIG. 1, the data may identify the particular target 104, a type of the target 104, that the target 104 is friendly, or the like. Also, for this embodiment, the electro-optical device is represented by an electro-optical detector 108 and the optical ID system is represented by the RFID tag 106a and an optical transmitter 106b, each of which may be coupled to the target 104 in any suitable manner.

The processor 202 is coupled to the transmitter 204 and the receiver 206, as well as to the electro-optical detector 108. The transmitter 204 includes a signal/waveform generator 208, a high-power amplifier 210, a circulator/duplexer 212 and a high-gain antenna 214. The receiver 206 includes a low-noise receiver 216 and a demodulator 218. For some embodiments, the signal/waveform generator 208 and the demodulator 218 may each include a frequency converter.

The processor 202 is configured to provide radar detection and tracking of the target 104 through the transmitter 204 and the receiver 206, as indicated by the radar signal 110, which may include an interrogation waveform generated by the radar system 102. After the target 104 is located by the radar system 102, the processor 202 is also configured to notify the electro-optical detector 108 of the location of the target 104.

The target 104 is configured to receive the radar signal 110 at the RFID antenna 302 and, based on the radar signal 110 (i.e., the interrogation waveform), the RFID tag 106a is configured to provide the identifying data that is associated with the target 104 to the optical transmitter 106b. The frequency converter 304 may be configured to up-convert or down-convert the frequency of the radar signal 110. Thus, for embodiments in which the frequency of the radar system 102 is different from the frequency used by the RFID tag 106a, the optional frequency converter 304 may be included as part of the target 104. For example, including the frequency converter 304 allows a commercial RFID tag 106a to be used in conjunction with a high-performance military or commercial radar system 102.

The optical transmitter 106b, which includes a light source (such as a light-emitting diode or the like in the visible or non-visible radiofrequency spectrum), is configured to generate an optical signal 112 based on the identifying data provided by the RFID tag 106a and to optically transmit the optical signal 112 via the light source. For example, the optical transmitter 106b may be configured to flash the light source in a particular pattern, at a particular frequency, or in any other suitable manner so as to transmit the optical signal 112. The electro-optical detector 108 is configured to detect the optical signal 112 transmitted from the optical transmitter 106b based on the target location provided by the processor 202 and to decode the optical signal 112 in order to extract the identifying data.

For some embodiments, the electro-optical detector 108 is also configured to determine the identity of the target 104 based on the identifying data and to determine a status of the target 104 (e.g., whether the target 104 is friendly or enemy or unknown) based on the determined identity. The electro-optical detector 108 is also configured to provide the identity and/or the status of the target 104 to the processor 202 of the radar system 102.

Although FIG. 4 illustrates one example of a system 100 for providing remote target identification using radiofrequency identification, various changes may be made to the embodiment shown in FIG. 4. For example, the makeup and arrangement of the system 100 are for illustration only. Components could be added, omitted, combined, subdivided, or placed in any other suitable configuration according to particular needs.

Figure 5A:
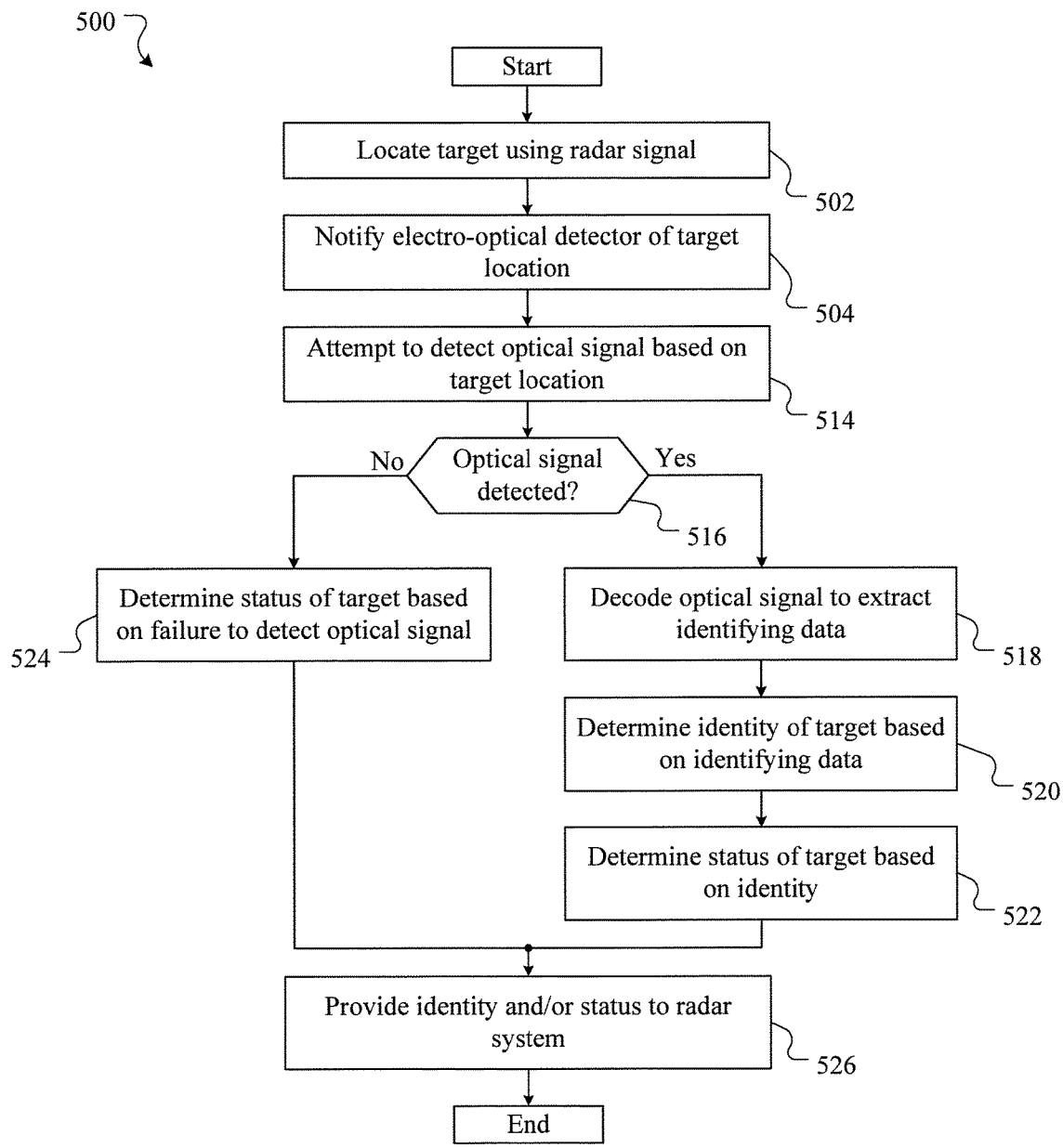
FIGS. 5A-5B are flowcharts illustrating a method for providing remote target identification using radiofrequency identification in accordance with an embodiment of the present disclosure.
Figure 5B:
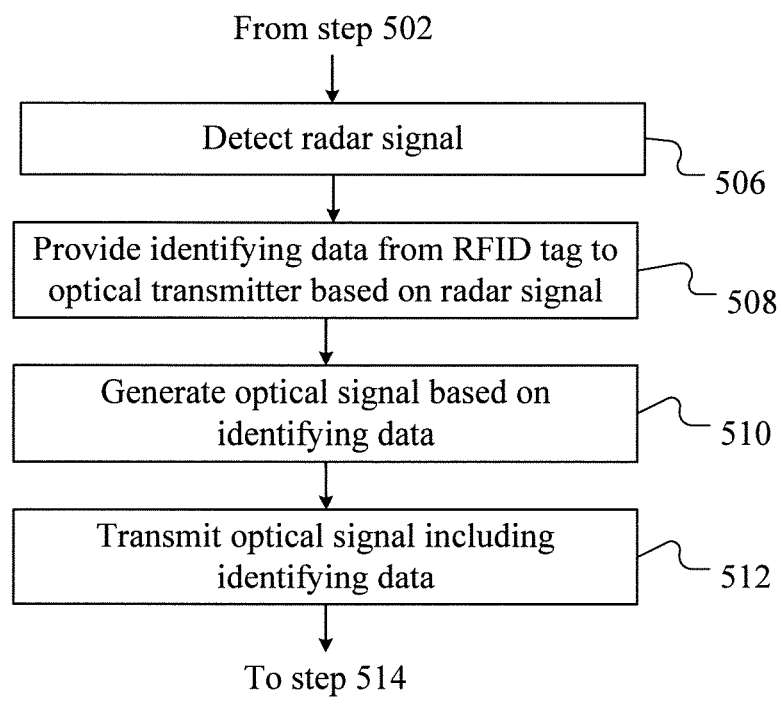

FIGS. 5A-5B are flowcharts illustrating a method 500 for providing remote target identification using radiofrequency identification in accordance with another embodiment of the present disclosure. The method 500 shown in FIGS. 5A-5B is for illustration only. Remote target identification using radiofrequency identification may be provided in any other suitable manner without departing from the scope of this disclosure.

FIG. 5A illustrates a portion of the method 500 from the perspective of the radar system 102 and the electro-optical detector 108, while FIG. 5B illustrates a portion of the method 500 from the perspective of the target 104. Thus, the portion of the method 500 of FIG. 5B may be incorporated as part of the method 500 of FIG. 5A when the target 104 is identifiable by the electro-optical detector 108. However, when a target does not include an optical ID system 106, the portion of the method 500 shown in FIG. 5B is omitted.

Initially, a radar system 102 locates a target using a radar signal 110 (step 502). For example, in some embodiments, the radar system 102 may locate a target using a radar signal 110 that includes an interrogation waveform. The radar system 102 notifies an electro-optical detector 108 of the location of the target 104 (step 504). For example, in some embodiments, a processor 202 of the radar system 102 notifies the electro-optical detector 108 of the location.

As shown in FIG. 5B, if the target 104 includes an optical ID system 106, the target 104 detects the radar signal 110 generated by the radar system 102 (step 506). Based on the interrogation waveform included in the radar signal 110, the target 104 provides identifying data from the RFID tag 106a to the optical transmitter 106b (step 508). The optical transmitter 106b generates an optical signal 112 based on the identifying data provided from the RFID tag 106a (step 510) and transmits the optical signal 112 including the identifying data (step 512).

As shown in FIG. 5A, based on the target location provided by the radar system 102, the electro-optical detector 108 attempts to detect an optical signal 112 (step 514). If the target 104 includes an optical ID system 106, the electro-optical detector 108 detects the optical signal 112 transmitted by the optical transmitter 106b (step 516) and decodes the optical signal 112 to extract the identifying data (step 518). The electro-optical detector 108 determines an identity of the target 104 based on the identifying data (step 520). For example, in some embodiments, the electro-optical detector 108 may determine an identity of the target 104, such as an identity of the particular target 104, an identity of a type of the target 104, or the like.

The electro-optical detector 108 determines a status of the target 104 based on the determined identity (step 522). For example, in some embodiments, the electro-optical detector 108 may determine that the status of the target 104 is "friendly" if the target 104 has been identified (i.e., the target 104 has provided a detectable optical signal 112) or if the determined identity corresponds to a known friendly target 104.

If the target located by the radar system 102 does not include an optical ID system 106, when the electro-optical detector 108 attempts to detect an optical signal 112 (step 514), no optical signal 112 is detected (step 516) and, thus, the electro-optical detector 108 determines a status of the target based on the failure to detect the optical signal 112 (step 524). For example, in some embodiments, the electro-optical detector 108 may determine that the status of the target is "enemy" (or "unknown") based on the failure to detect the optical signal 112.

After determining the status of the target 104 (step 522) or the target (step 524), the electro-optical detector 108 then provides the identity and/or the status to the radar system 102 (step 526). For example, in some embodiments, the electro-optical detector 108 may provide the identity and/or status to the processor 202 of the radar system 102.

Although FIG. 5 illustrates one example of a method 500 for providing remote target identification using radiofrequency identification, various changes may be made to the embodiment shown in FIG. 5. For example, while shown as a series of steps, various steps in FIG. 5 could overlap, occur in parallel, occur in a different order, or occur multiple times. For a specific example, the electro-optical detector 108 may provide the optical data to the radar system 102, and the radar system 102 may then determine the identity of the target 104 based on the optical data and the status of the target 104 based on the identity. As another alternative, the electro-optical detector 108 may determine the identity of the target 104 based on the optical data and provide the identity to the radar system 102, and the radar system 102 may then determine the status of the target 104 based on the identity. In addition, for some embodiments, the determined identity may include an identity of the status of the target 104 (e.g., that the target 104 is friendly). For these embodiments, a separate determination of the status of the target 104 may be omitted.

Modifications, additions, or omissions may be made to the apparatuses and methods described here without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for providing remote target identification, comprising:
    a radar system configured to:
        generate and transmit a radar signal to a target;
        locate the target using the radar signal; and
        generate a target location where the target is located; and
    an electro-optical detector that is co-mounted and north-aligned with the radar system, the electro-optical detector configured to:
        receive the target location from the radar system;
        detect an optical signal transmitted by the target, wherein the optical signal is transmitted by the target in response to reception of the radar signal, and wherein the optical signal comprises identifying data for the target;
        determine an identity and a status of the target based on the identifying data for the target; and
        provide the identity and status of the target to the radar system.

2. The system of claim 1, wherein the electro-optical detector is further configured to decode the optical signal to extract the identifying data.

3. The system of claim 1, wherein the status indicates whether the target is friendly.

4. The system of claim 1, wherein the optical signal is transmitted from an optical transmitter of the target, and wherein the optical transmitter comprises a light-emitting diode.

5. The system of claim 1, wherein the electro-optical detector is further configured to attempt to detect a second optical signal from a second target and to determine a status of the second target based on a failure to detect the second optical signal from the second target.

6. The system of claim 1, wherein the radar system is further configured to notify the electro-optical detector of the target location.

7. The system of claim 1, wherein the target comprises an unmanned aerial vehicle (UAV).

8. The system of claim 1, wherein the radar signal comprises an interrogation waveform generated by a waveform generator.

9. The system of claim 1, wherein the radar system further comprises a high-power amplifier.

10. The system of claim 1, wherein the radar signal is configured to be detected by a radio frequency identification (RFID) antenna at the target.

11. A method for providing remote target identification, comprising:
   generating, by a radar system, a radar signal;
   transmitting, by the radar system, the radar signal to a target;
   locating, by the radar system, the target using the radar signal;
   generating, by the radar system, a target location where the target is located;
   receiving, by an electro-optical detector, the target location from the radar system, wherein the electro-optical detector is co-mounted and north-aligned with the radar system;
   detecting, by the electro-optical detector, an optical signal transmitted by the target, wherein the optical signal is transmitted by the target in response to reception of the radar signal, and wherein the optical signal comprises identifying data for the target;
   determining, by the electro-optical detector, an identity and a status of the target based on the identifying data for the target; and
   providing, by the electro-optical detector, the identity and status of the target to the radar system.

12. The method of claim 11, wherein the electro-optical detector is further configured to decode the optical signal to extract the identifying data.

13. The method of claim 11, wherein the status indicates whether the target is friendly.

14. The method of claim 11, wherein the optical signal is transmitted from an optical transmitter of the target, and wherein the optical transmitter comprises a light-emitting diode.

15. The method of claim 11, wherein the electro-optical detector is further configured to attempt to detect a second optical signal from a second target and to determine a status of the second target based on a failure to detect the second optical signal from the second target.

16. The method of claim 11, wherein the radar system is further configured to notify the electro-optical detector of the target location.

17. The method of claim 11, wherein the target comprises an unmanned aerial vehicle (UAV).

18. The method of claim 11, wherein the radar signal comprises an interrogation waveform generated by a waveform generator.

19. The method of claim 11, wherein the radar system further comprises a high-power amplifier.

20. The method of claim 11, wherein the radar signal is configured to be detected by a radio frequency identification (RFID) antenna at the target.

* * * * *